United States Patent Office 3,667,997
Patented June 6, 1972

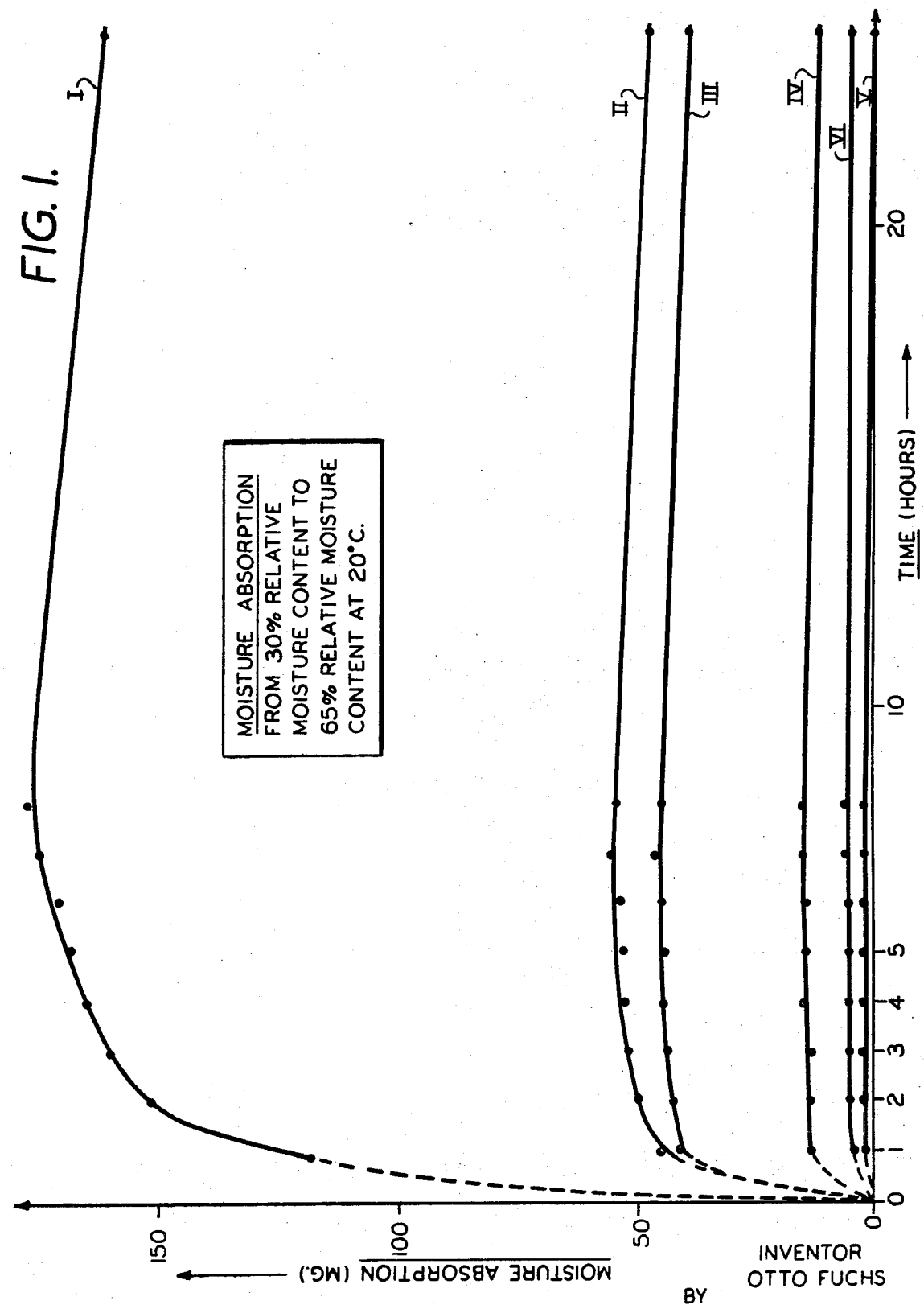

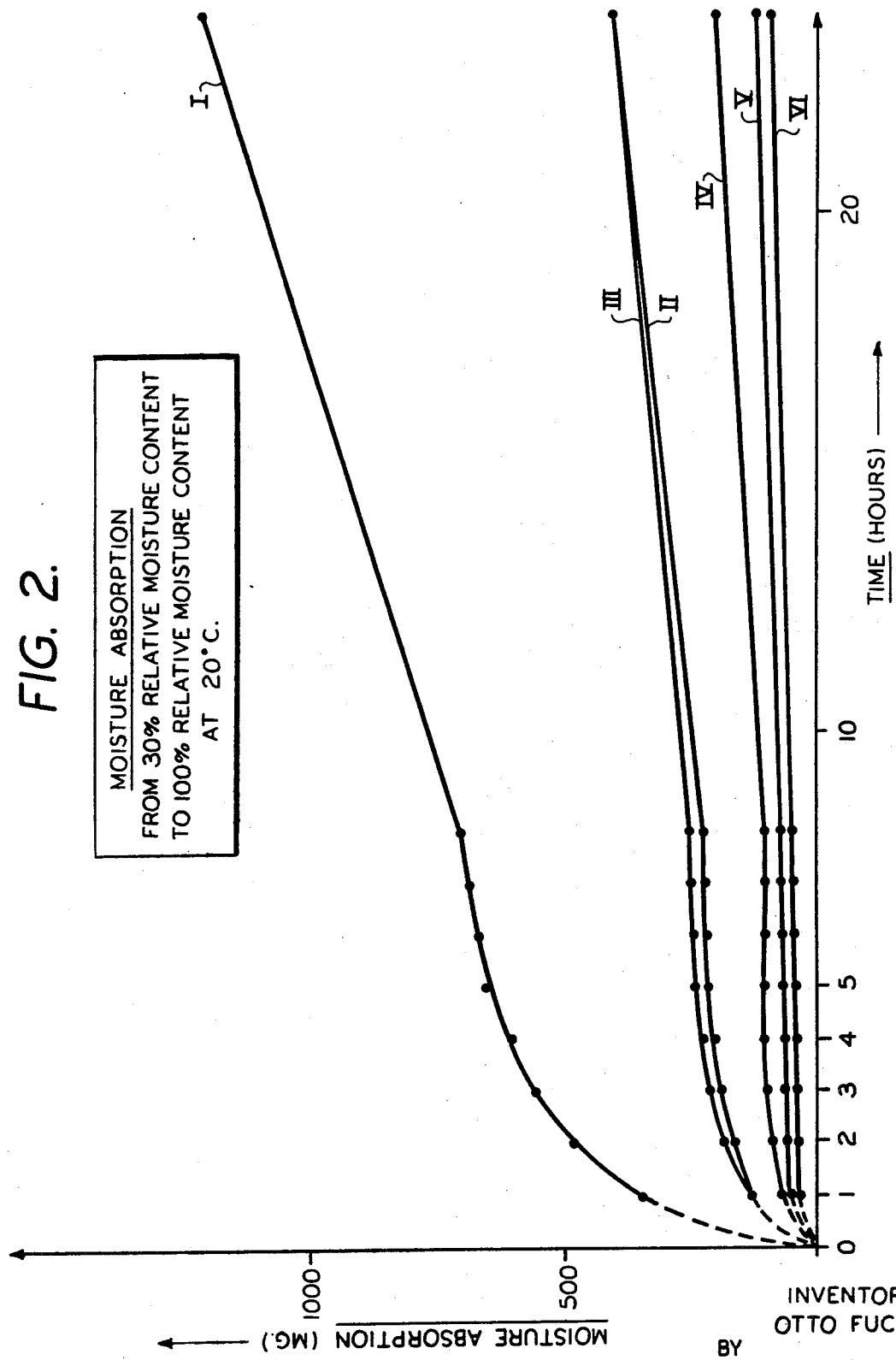

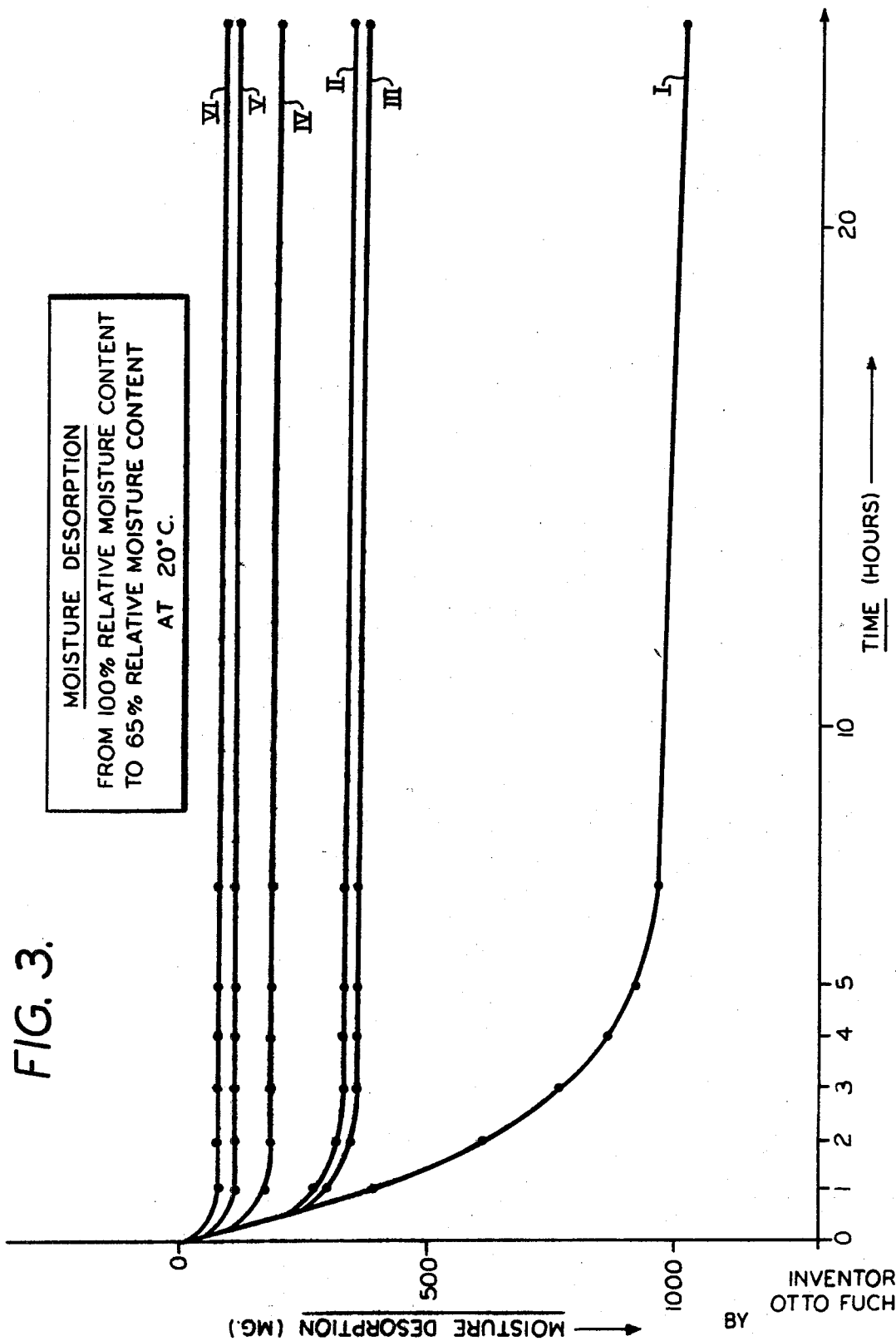

3,667,997
PROCESS FOR THE MANUFACTURE OF OPEN-PORE POLYVINYL CHLORIDE FOAMS HAVING HYDROPHILIC QUALITIES WHICH ARE CAPABLE OF A REVERSIBLE ABSORPTION AND YIELDING OF MOISTURE
Otto Fuchs, Oberlar, Germany, assignor to Dynamit Nobel AG., Troisdorf, Bezirk, Cologne, Germany
Filed Jan. 2, 1969, Ser. No. 789,083
Claims priority, application Germany, Jan. 2, 1968, P 16 69 997.1
Int. Cl. B32b 27/08
U.S. Cl. 117—98                 5 Claims

ABSTRACT OF THE DISCLOSURE

Production of polyvinyl chloride foam form articles which are hydrophilic and have reversible absorption and desorption of moisture characteristics by impregnating previously formed foams of polyvinyl chloride with about 4 to 20 weight percent polyvinyl alcohol. The polyvinyl alcohols as used in an acetyl content of less than about 5% and are impregnated as an aqueous solution thereof.

Open-pore, plasticized polyvinyl chloride foams are used particularly as upholstery padding on inner springs due to their outstanding properties and to the ease with which they can be high-frequency welded. In contrast to the well-known cellulose sponge materials, the synthetic foams in general (with the exception of polyvinyl alcohol foams ["Kunststoffe" 50/12, 729–732, 1960]) have no hydropholic behavior, or only a slight one due to emulsifiers. Whenever textile coverings made from natural fibers are used over the foam padding in the manufacture of upholstered chairs, these coverings are capable of absorbing a certain amount of moisture, and so they generally are not "sweaty" to sit on.

In recent times, air-permeable or perforated, so-called "breathing" artificial leathers have been used, especially in motor car seats. In contrast to natural textile fibers, however, these artificial leathers are not capable of absorbing moisture. When one sits on such artificial leathers one soon perceives a sweaty feeling which is not produced by wool, cotton or other hydrophilic fiber mixes. The situation is aggravated by the fact that the material of which the sitter's clothing is made is increasingly non-hydrophilic due to the increasing use of synthetic fibers in fabrics, which do permit the passage of air through them but do not permit the absorption of moisture.

Although the synthetic foams are also open-pored and permeable to air, and although their permeability, especially in the case of motor vehicle seats, is further augmented by the pumping action produced in use, the removal of moisture and of water vapor is inadequate, since the foam material acts as an insulation which produces a cold face on the underside of the artificial leather, causing moisture to condense on the said artificial leather, which has no moisture absorption.

Thus it is desirable to make plasticized PVC foams hydrophilic to such an extent as to be capable of absorbing water vapor or moisture, as the case may be, when the seat is first sat on, and of yielding this water vapor later on when the seat becomes warm, thus permitting a reversible absorption and yielding of moisture. Until now, however, no process has been made known for the accomplishment of this.

It has now been found that open-pore polyvinyl chloride foams having a hydrophilic behavior and reversible absorption and desorption of moisture can be manufactured by impregnating the foams with 4 to 20% by weight of polyvinyl alcohols, using aqueous solutions thereof and then drying them. The term polyvinyl alcohols is to be understood to mean completely or partially saponified polyvinyl acetates, such as those which are commercially available under the name "Mowiol."

FIGS. 1, 2 and 3 show moisture absorption and yield of the specimens set forth in the examples.

The polyvinyl alcohols set forth herein as being commercially available are conventional materials having various K values and various acetyl group content. It is preferred, according to the practice of this invention that the acetyl content be less than about 5%.

This does not result in any impairment or loss of high-frequency weldability. On the contrary, the latter may be improved by the higher dielectric constants and the greater loss angle resulting from a low moisture content in the surfaces. Though it is true that the moisture content or amount of moisture per unit of volume must be low and free from variation so that the welding machine can be kept constant in its adjustment and uniform in operation, this can be assured by packing the foam products in polyethylene wrappers or bags and storing them. PVC itself is rot-proof and generally does not require the addition of agents to protect it against microbial attack. In the case of the post-treated, plasticized PVC foams, however, it may be desirable to add known fungicides. Known fungicides which may exemplify such use according to this invention are oxyquinoline potassium sulfate, epoxidized soybean oil in combination with a known organic arsenic compound.

It may be desirable to utilize emulsifiers, wetting agents, dyes and pigments or other similar conventional additive materials in the practice of this invention. The emulsifiers are standard known commercial type and may be exemplified by sodium lauryl sulfate and/or fatty alcohols having at least about 12 carbon atoms. The wetting agents are similarly conventional and readily commercially available materials. These include alkyl naphthalene sulfonic acid salts, such as alkali metal salts; and salts of amines such as ethylene diamine, diethylene triamine and triethylene tetramine. Dyes, pigments, tints and other materials of this type are conventionally known for both polyvinyl alcohol and polyvinyl chloride. Such conventional materials may be used where desired. According to conventional practice, it may be necessary or advisable to incorporate UV stabilizers, antioxidants, and other similar materials in either the polyvinyl alcohol or the polyvinyl chloride, according to conventional practice.

The polyvinyl chlorides which are particularly preferred in the practice of this invention are those having K values of about 65 to 82, most preferably about 75, and they are of the "stir-in-type." This means polyvinyl chloride which can be produced by emulsion polymerisation. The K value can be determined according to DIN 53726.

The saponified polyvinyl alcohols used herein have been noted to be commercial materials. These materials are described in the book "Polyvinylalkohole" by Franz Kainer, Stuttgart, 1949, and in an article in "Meliand Textil Bericht," 1963, pp. 1136–1138. These polyvinyl alcohols generally have K values of about 30 to 70.

Suitable plasticizers for the polyvinyl chloride include alkyl phthalates, alkyl adipates, alkyl sebacates, alkyl phosphates, aryl phosphates, alkaryl phosphates, aryl esters of alkyl sulfonic acids, epoxidized fatty acids and vegetable oils such as epoxidized soybean oil and the like. The ratio of polyvinyl chloride to plasticizer may be about 5:5 to 5:3.

Unlike sponges, cushions are not washed, so that, like in the case of textile finishes, the polyvinyl alcohol is permanently incorporated into the foam. For other applications, such as the preparation of PVC foams for use as sponges, for example, it is nevertheless also possible to use a solution of polyvinyl alcohol and formaldehyde in an acid solvent, resulting in the production, by acetalization, of polyvinyl alcohol impregnations that are stable in water and cannot be washed out. This waterproof fixing can also be performed by means of urea formaldehyde or phenol formaldehyde precondensation products.

In the practical performance of the impregnation, foam sheets of polyvinyl chloride are impregnated by passing them through aqueous solutions of polyvinyl alcohol or by spraying them and then subjecting them to a rolling procedure in which the excess solution is squeezed out or the solution applied to the surface is pressed into the interior of the sheet, so that a uniform distribution is achieved throughout the cell structure of the foam. It may be desirable to add emulsifiers, wetting agents, dyes and stabilizers having a fungicidal action. Then the sheets of foam are dried in a conventional heating tunnel.

EXAMPLES

Polyvinyl chloride foam sheets having a thickness of 10 mm. were impregnated with the polyvinyl alcohol solutions listed in the table. The impregnated sheets were squeezed out in a wringing machine and dried in a circulating-air drying oven at 50° C.

The polyvinyl alcohols listed in the following table have two numbers set forth thereafter, for example, 30/98. These values designate the K values and the degree of saponification. The first number is the K value, and the second number is the degree of saponification in mol percent. The acetyl content of the saponified polyvinyl alcohol can be readily calculated by subtracting the second number from 100.

The polyvinyl chloride which has been set forth in the above examples is a homopolymer. It is of course within the scope of this invention to utilize copolymers of polyvinyl chloride with at least one other material which is a conventional copolymerizing monomer with polyvinyl chloride. Where copolymers are used, the comonomer may be exemplified by vinylidene chloride, acrylonitrile, dialkyl maleates, dialkyl fumarates, and the like. The comonomer may be used in proportion of about 5 to 15 weight percent, based upon the total polymer.

| Specimen No. | Weight of foam | PVA solution | Wet weight | Dry weight | PVA absorpiion Weight, g. | Percent |
|---|---|---|---|---|---|---|
| I | 243.7 | 15% solution Mowiol [1] 30/98 | 504.5 | 281.5 | 37.8 | 16 |
| II | 211.7 | 6.5% solution Mowiol [2] 70/98 | 429.5 | 225.1 | 13.4 | 6.35 |
| III | 212.3 | 7.5% solution Mowiol [3] 30/98 | 354.7 | 222.3 | 10 | 4.7 |
| IV | 236.9 | 3.25% solution Mowiol [4] 70/98 | 389.2 | 241.2 | 4.3 | 1.83 |
| V | | Untreated specimen | | | | |
| VI | | Specimen washed free of emulsifier (weight loss: 0.45%) | | | | |

[1] 15% solution of polyvinyl alcohol 30/98.
[2] 6.5% solution of polyviny alcohol 70/98.
[3] 7.5% solution of polyviny alcohol 30/98.
[4] 3.25% solution of polyvinyl alcohol 70/98.

Hydrophilic foams made of soft polyvinyl chloride in this manner are usable in many ways, particularly in the motor vehicle, upholstery, footwear and clothing industry, but they are also usable for cosmetic and household products.

What is claimed is:

1. A plasticized open-pored polyvinyl chloride foam having deposited in the pores thereof 4 to 20 weight percent, based upon the weight of the vinyl-impregnated product, of the dried residue of a water solution of polyvinyl alcohol having an acetyl content of less than 5 mol percent.

2. A foam as claimed in claim 1, wherein said polyvinyl alcohol has a K value of about 30 to 70.

3. A foam as claimed in claim 1, wherein said polyvinyl chloride has a K value of about 75.

4. A foam as claimed in claim 1, wherein said polyvinyl chloride is a homopolymer.

5. A foam as claimed in claim 1, wherein at least one member selected from the group consisting of urea formaldehyde and phenol formaldehyde precondensation products is incorporated in said foam, together with said polyvinyl alcohol.

References Cited

UNITED STATES PATENTS

| | | |
|---|---|---|
| 3,057,750 | 10/1962 | Bennett et al. _____ 117—161 X |
| 2,690,407 | 9/1954 | Pessel _____ 117—161 UHE |
| 2,837,770 | 6/1958 | Herrmann et al. 117—161 UHE |
| 3,249,465 | 5/1966 | Chen _____ 117—98 |
| 3,348,989 | 10/1967 | Roberts _____ 117—98 |
| 3,360,415 | 12/1967 | Hellman et al. _____ 117—98 |
| 3,471,419 | 10/1969 | Ehrlich _____ 117—98 |

OTHER REFERENCES

Davidson-Sittig, Water Soluble Resins, Reinhold, New York, 1962, pp. 91–93, 106 and 107.

WILLIAM D. MARTIN, Primary Examiner

S. L. CHILDS, Assistant Examiner

U.S. Cl. X.R.

117—138.8 UA, 161 UE